United States Patent [19]
Okamoto et al.

[11] Patent Number: 5,554,286
[45] Date of Patent: Sep. 10, 1996

[54] MEMBRANE FOR LIQUID MIXTURE SEPARATION

[75] Inventors: Kenichi Okamoto; Hidetoshi Kita, both of Yamaguchi; Masakazu Kondo, Chiba; Norikazu Miyake; Yasuo Matsuo, both of Tokyo, all of Japan

[73] Assignee: Mitsui Engineering & Shipbuilding Co., Ltd., Tokyo, Japan

[21] Appl. No.: 493,538

[22] Filed: Jun. 22, 1995

Related U.S. Application Data

[63] Continuation-in-part of Ser. No. 352,768, Dec. 2, 1994, abandoned.

[30]     Foreign Application Priority Data

Dec. 27, 1993 [JP] Japan .................................. 5-331141

[51] Int. Cl.$^6$ .................................................. B01D 71/02
[52] U.S. Cl. .......................... 210/500.25; 210/640
[58] Field of Search ................................... 210/640, 490, 210/500.25, 500.26; 502/64

[56]     References Cited

U.S. PATENT DOCUMENTS

| 5,019,263 | 5/1991 | Haag et al. |
|---|---|---|
| 5,266,542 | 11/1993 | Hashimoto et al. ................... 502/64 |
| 5,316,753 | 5/1994 | Nakagawa ............................. 423/706 |

FOREIGN PATENT DOCUMENTS

| 0135069 | 3/1985 | European Pat. Off. |
|---|---|---|
| 0511739 | 11/1992 | European Pat. Off. |
| 4105834 | 8/1992 | Germany. |
| WO93/19841 | 10/1993 | WIPO. |

*Primary Examiner*—Frank Spear
*Attorney, Agent, or Firm*—Kanesaka & Takeuchi

[57]     ABSTRACT

A membrane for liquid mixture separation is composed of an A-type zeolite film deposited on a porous support after seed crystals are held on a surface of the support.

12 Claims, 2 Drawing Sheets

MEMBRANE FOR LIQUID MIXTURE SEPARATION

REFERENCE TO A RELATED APPLICATION

This is a continuation-in-part application of Ser. No. 352,768 filed on Dec. 2, 1994, now abandoned.

BACKGROUND OF THE INVENTION

1. Field of the Invention

The present invention relates to a membrane for liquid mixture separation to be used in the pervaporation or vapor permeation.

2. Description of the Related Art

Over the past years, a great deal of research has been devoted to separating liquid mixture using the pervaporation or vapor permeation technique through non-porous polymeric membranes. This separation process can be applied successfully to mixtures that are difficult to separate by is the case conventional techniques, such as is the case for azeotropic mixtures or mixtures of liquids with very small differences in vapor pressures. For example, studied the separation of an azeotropic mixture through polyvinyl alcohol membrane was studied. (U.S. Pat. No. 2,953,502) Recently, the separation of water-formaldehyde mixture thorugh styrene-acrylic acid copolymer membrane has been reported. (U.S. Pat. No. 4,035,291). These membranes, however, have not been used practically because of insufficient permeation rates or insufficient separating factors.

Under these circumstances, the pervaporation and vapor permeation are the more recently recognized separation processes. They are regarded as a promising separation process which will supplement or supersede the distillation. It is considered that they are especially suitable for the separation of water-ethanol azeotrope. Therefore, active research and development works have been performed on these methods and some practical membranes for them have been proposed. For example, a cellulos membrane and a polyvinyl alcohol membrane are disclosed in Japanese Patent Laid-open No. 109204/1984 and a cross-linked polyethyleneimine membrane is disclosed in Japanese Patent Laid-open No. 55305/1984. However, these membranes disclosed so far are not of practical use because of insufficient separating factors or permeating rates to similar physical propaties, as in the case of water and methanol. In addition, they show insufficient resistance to organic solvents such as DMF and (N,N-dimethylformamide). These shortcomings restrict their use to the separation of water from limited substances, such as alcohols and ketones having three or more carbon atoms.

OBJECT AND SUMMARY OF THE INVENTION

It is an object of the present invention to provide a membrane with sufficient permeation rates and separating factors for liquid mixture separation to be used in the pervaporation or vapor permeation. They are free from the above-mentioned shortcomings of conventional membranes and capable of separating liquid mixture very efficiently with stable high permeation rates.

According to the present invention, the membrane for liquid mixture separation is composed of a porous support and an A-type zeolite film on the porous support which is deposited after seed crystal particles are held thereon.

Because of its molecular sieve action, zeolite is expected to be used as a membrane for liquid mixture separation. A practical commercial membrane with sufficient separating property, strength, chemical stability, and handling properties has been realized by forming a membrane of A-type zeolite on a porous support carried with seed crystals thereon according to the present invention.

The membrane for liquid mixture separation as defined in the present invention permits high selectivity of water permeation on account of the molecular sieve action of zeolite. Therefore, it permits the stable, efficient separation of water-methanol mixture which has been difficult to separate using the conventional membrane.

According to the present invention, A-type zeolite is employed although zeolite is available in several types, such as A-type, X-type, and Y-type, because it exhibits high molecular sieve action and separation selectivity and can be synthesized by hydrothermal process at low temperatures without requiring complex reactors such as autoclaves, as demonstrated in Examples mentioned later.

DESCRIPTION OF THE PREFERRED EMBODIMENTS

Figure 1:
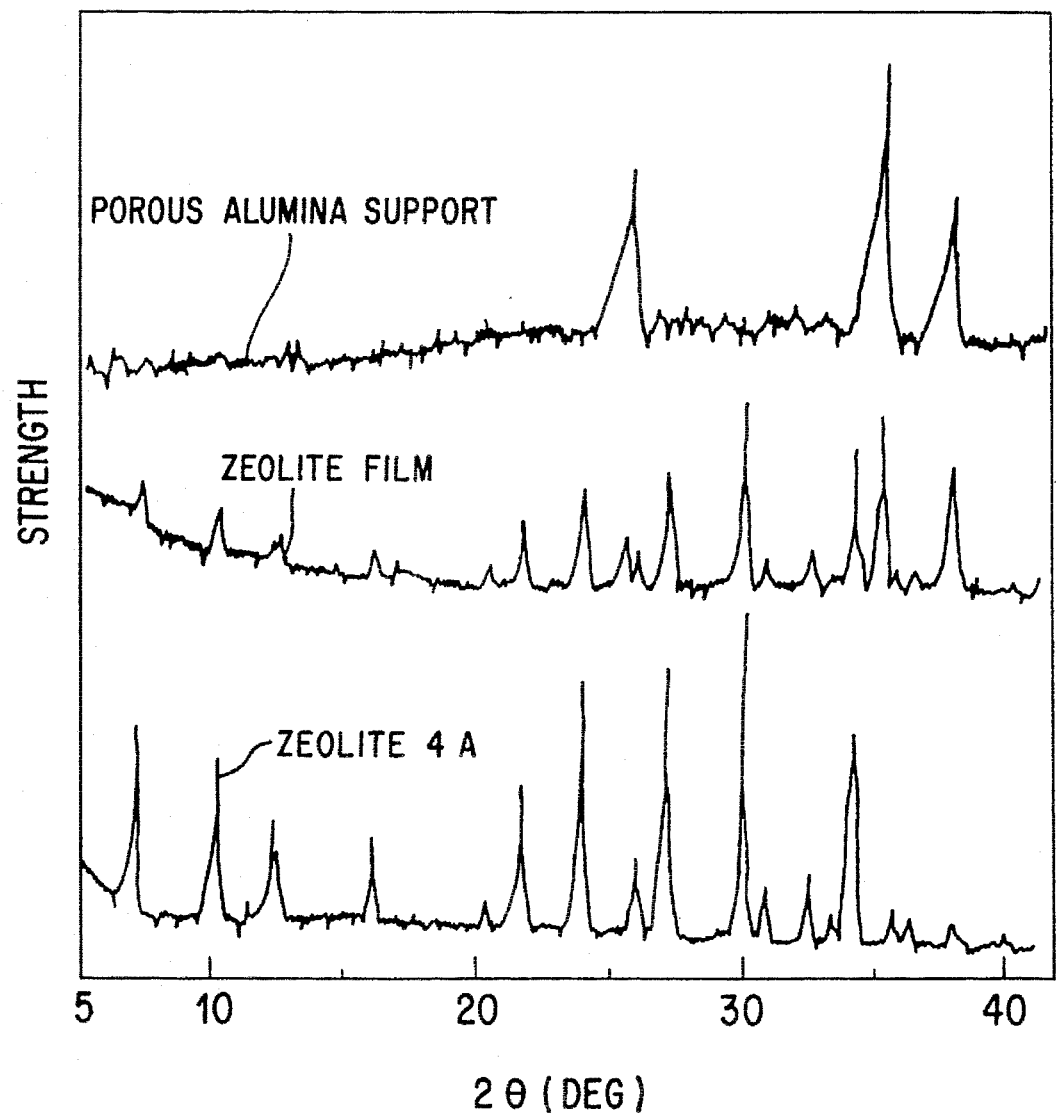
FIG. 1 shows X-ray diffraction patterns of porous alumina support, zeolite film formed thereon, and zeolite 4A used in Example 1.

According to the present invention, the membrane for liquid mixture separation is composed of a porous support and A-type zeolite film which is deposited after seed crystals are held thereon.

The porous support is made preferably of ceramics such as mullite containing $Al_2O_3$ and $SiO_2$. Other ceramics (such as alumina, silica, zirconia, silicon nitride, silicon carbide etc.), metals (such as aluminum, silver, stainless steel etc.), or organic polymers (such as polyethylene, polypropylene, polytetrafluoroethylene, polysulfone, polyimide etc.) are also employed. It should preferably have an average pore diameter of 0.05–10 μm and a porosity of 10–60%. With an average pore diameter not greater than 0.05 μm, it will be unpractically in insufficient permeation rate. With an average pore diameter not smaller than 10 μm, it will be in insufficient separating factor. With a porosity not greater than 10%, it will be in insufficient permeation rate. With a porosity not smaller than 60%, it will have low separating factor in selectivity and strength of material. A preferred porous support is that of $Al_2O_3$—$SiO_2$ ceramic material containing $Al_2O_3$ of 30–80 wt % which has an average pore diameter of 0.1–2 μm, and a porosity of 30–50%.

No restrictions are imposed on the shape of the porous support; however, the one used for the pervaporation or vapor permeation should be in the form of pipe, 20–100 cm long, about 10–30 mm in outside diameter, and 0.2 mm to several mm in thickness, or in the form of cylinder, 20–100 cm long, 30–100 mm in outside diameter, and 0.2 mm to several mm in thickness, having a plurality of holes, 2–12 mm in inside diameters, arranged parallel in the axial direction.

On this porous support is synthesized A-type zeolite film after the seed crystals are held thereon. The seed crystals are preferably A-type zeolite ones having an average particle size of less than 200 μm, more preferably 1–5 μm. The seed crystals are preferably held on the surface of the support in an amount of 0.1–90 mg/cm$^2$, more preferably 0.5–5 mg/cm$^2$.

The seed particles are held on the support by coating dispersion dispersed with seed particles in dispersion medium (preferably water). Instead thereof, the seed particles may be held on the support by mixing them into other raw materials when preparing the porous support.

The A-type zeolite film is formed by the hydrothermal method or vapor phase method, which employs as the starting materials sodium silicate, silica gel or sol, or silica powder (as the silica source) and sodium aluminate or aluminum hydroxide (as the alumina source).

The hydrothermal method for A-type zeolite film formation should preferably be carried out at 60°–150° C. more preferably at 80°–100° C. for 1–24 hours more preferably 2–5 hours, most preferably 3–4 hours once (not repeatedly).

When the porous support is of $Al_2$—$SiO_3$ ceramic material containing $Al_2O_3$ in an amount of 30–80 wt %, an excellent A-type zeolite film is formed by only one preparing process under the preparation conditions of 90°–100° C. and more than 2 hours (preferably 2–4 hours).

The molar ratio of components of the starting material should be as follows:

$H_2O/Na_2O = 20–300$, preferably 60

$Na_2O/SiO_2 = 0.3–2$, preferably 1

$SiO_2/Al_2O_3 = 2–6$, preferably 2

The A-type zeolite film should be formed on one side or both sides of the porous support held with seed crystals thereon, such that the film thickness is 10–50 μm and the total thickness of the membrane (including the support) is 0.5–2 mm. In this way there is obtained the membrane for liquid mixture separation according to the present invention.

The thus obtained membrane can be used water removal from liquid mixture in the pervaporation or vapor permeation.

The membrane of the present invention may be used to separate water from liquid mixture, as alcohols (such as methanol, ethanol, and propanol), ketones (such as acetone and methyl ethyl ketone), halogenated hydrocarbons (such as carbon tetrachloride and trichloroethylene), and their mixture composed of two or more components.

The liquid mixtures to which the membrane of the present invention can be applied with high selectivity are those of water with organic liquid, especially water-methanol and water-ethanol mixtures.

The membrane for liquid mixture separation as mentioned above exhibits high separating factor and permeation rates with high chemical stability and good handling properties when applied to liquid mixture separation by the pervaporation or vapor permeation.

With the membrane for liquid mixture separation as defined in the present invention, it is possible to separate water from its mixture with high separation factor and permeating rates than with the conventional membrane. Thus it finds use as a membrane reactor in the energy-saving, compact pervaporation or vapor permeation membrane separator for chemical reaction or solvent purification.

To further illustrate the invention, and not by way of limitation, the following examples are given.
Examples where the porous support is of alumina material:

EXAMPLE 1

An aqueous solution of sodium silicate and an aqueous solution of sodium hydroxide/aluminum hydroxide mixture were placed in a cylindrical glass container, with their molar ratios being as follows.

$H_2O/Na_2O = 60$ $Na_2O/SiO_2 = 1$ $SiO_2/Al_2O_3 = 2$

In the solution was immersed a tubular porous alumina support whose surface had been provided with crystal seeds. The support is "Multipoaron" made by Mitsui Kensaku-Toishi Co., Ltd., measuring 1 cm in outside diameter, 20 cm long, 1 mm thick, 1 μm in pore diameter, and 40% porosity. Hydrothermal synthesis was carried out at 100° C. for 3 hours, followed by rinsing and drying at 70° C. Thus there was obtained a membrane for liquid mixture separation which had a total thickness of about 1.05 mm.

The seed crystals are held on the porous support by coating dispersion containing commercial zeolite 4A powder having a particle size of 200 mesh under (less than 345 μm) in an amount of 6 wt % with a brush. The seed crystals are held on the surface of the support by 1 mg/cm$^2$ on an average.

The zeolite film formed as mentioned above was examined by X-ray diffraction. The X-ray diffraction pattern is shown in FIG. 1, together with those of the alumina support and commercial zeolite 4A. It is noted that the X-ray pattern of the zeolite film coincides well with that of commercial zeolite 4A. This indicates that A-type zeolite had formed on the surface of the support.

The membrane for liquid mixture separation obtained in Example 1 was used for separation of water-ethanol mixture by the pervaporation method or vapor permeation.

Figure 2:
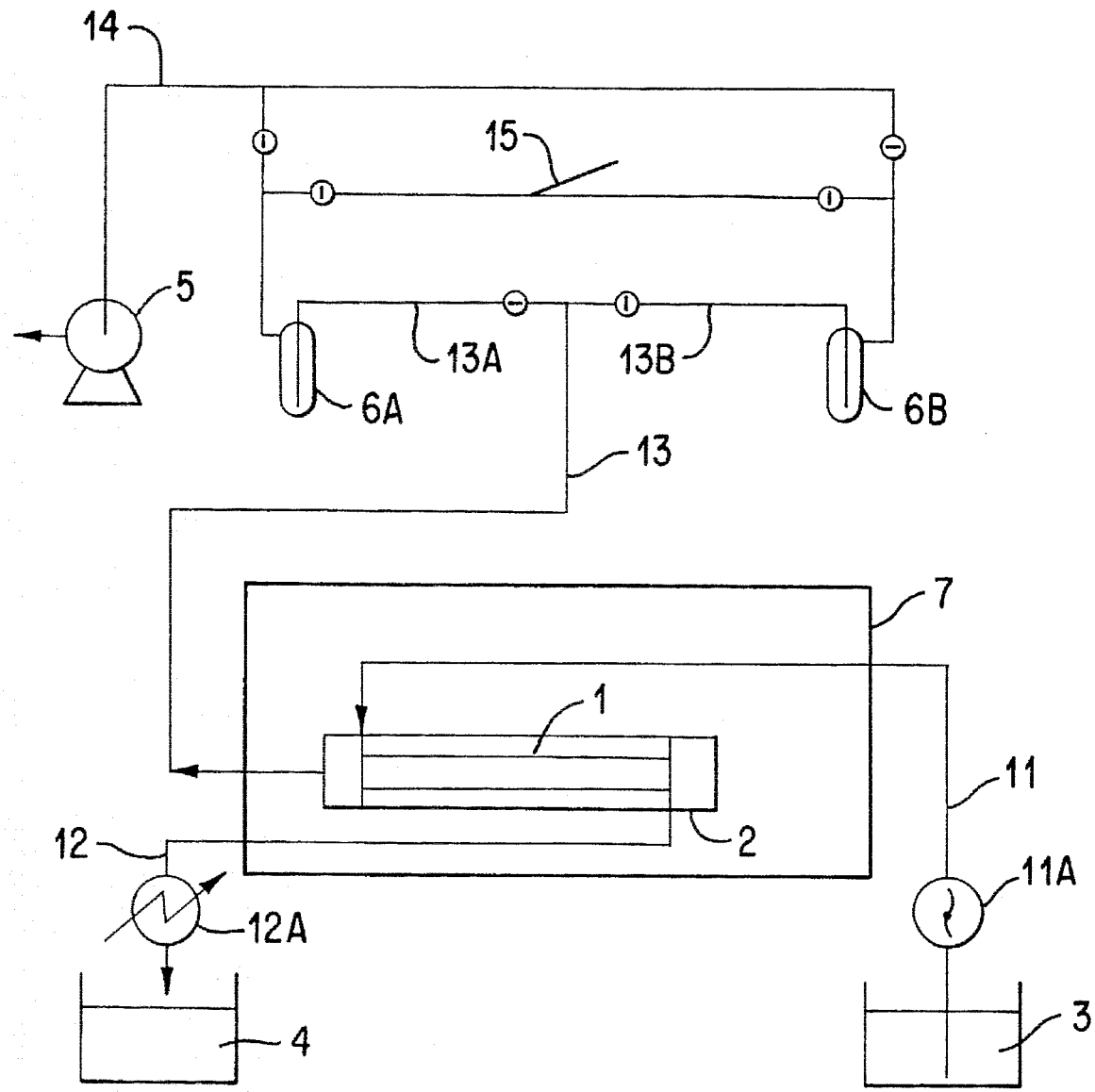
FIG. 2 is a schematic diagram showing the measuring apparatus used in Example 1.

The apparatus for the pervaporation or vapor permanation is shown in FIG. 2. The feed solution (3) comes into the cell (2) through the pipe (11) equipped with the pump (11A). The cell (2) is provided with the membrane (1) for liquid mixture separation. After separation, the product solution (4) is discharged through the pipe (12) equipped with the heat exchanger (12A). The permeate side of the membrane (1) is evacuated to 0.1 Torr by the vacuum pump (5) through the pipes (13, 13A, 13B, and 14). The permeate vapor is cooled by liquefied nitrogen and collected in the trap (6A, 6B). Gaseous nitrogen is discharged through the pipe (15).

The cell (2) is installed in the thermostat (7) which is regulated at a chamber with a treating temperature as shown in Table 1.

The membrane (1) for liquid mixture separation has an effective surface area of 47 cm$^2$. The feed solution was fed at a flow rate of 12–30 cm$^3$/min.

The composition of the solution was analyzed by gas chromatography. The membrane performance was evaluated by permeation rate in terms of total permeation flux per unit area and time (Q kg/m$^2$·h), and separation factor (α). The factor was calculated from the following formula.

$$\alpha = \frac{P_{ph}/P_w}{F_{ph}/F_w}$$

where $F_{ph}$ and $F_w$ respectively represent the average concentration (wt %) of organic solution and water in the feed one, and $P_{ph}$ and $P_w$ respectively represent the average concentration (wt %) of organic solution and water in the permeated one.

Table 1 shows the feed solution temperature, water concentration in feed solution, total permeation flux (Q), and separation factor (α).

EXAMPLE 2

A membrane for liquid mixture separation was prepared in the same manner as in Example 1 except that a $H_2O/Na_2O$ ratio was made 60.

EXAMPLE 3

A membrane for liquid mixture separation was prepared in the same manner as in Example 2 except that hydrothermal synthesis was carried out for 2 hours.

EXAMPLE 4

A membrane for liquid mixture separation was prepared in the same manner as in Example 2 except that hydrothermal synthesis was carried out for 6 hours.

Comparative Example 1

A membrane for liquid mixture separation was prepared in the same manner as in Example 2 except that hydrothermal synthesis was carried out for 1 hour.

Comparative Example 2

A membrane for liquid mixture separation was prepared in the same manner as in Example 2 except that hydrothermal synthesis was carried out for 0.5 hours.

Comparative Example 3

A membrane for liquid mixture separation was prepared in the same manner as in Example 1 except that hydrothermal synthesis was carried out at 80° C.

Comparative Examples 4–11

A membrane for liquid mixture separation was prepared in the same manner as in Example 1 except that no seed crystals were held on the support, molar ratios of the aqueous solution were made as shown in Table 1, and a plurality of processes of forming the film was conducted repeatedly.

Each of the membranes prepared in the examples 2–4 and comparative examples 1–11 was measured for separation properties in the same manner as the example 1, the results of which are shown in Table 1.

TABLE 1

Examples where the support is of porous alumina:

| | $\dfrac{H_2O}{Na_2O}$ | $\dfrac{Na_2O}{SiO_2}$ | $\dfrac{SiO_2}{Al_2O_3}$ | Temperature (°C.) | Reaction time (h) | amount of seed crystals (mg/cm$^2$) | times of processing (times) | flux (kg/m$^2$h) | separation factor (—) |
|---|---|---|---|---|---|---|---|---|---|
| Example 1 | 40 | 1.0 | 2.0 | 100 | 3 | 1.0 | 1 | 1.89 | 5200 |
| Example 2 | 60 | 1.0 | 2.0 | 100 | 3 | 1.0 | 1 | 2.15 | 10000 |
| Example 3 | 60 | 1.0 | 2.0 | 100 | 2 | 1.0 | 1 | 2.46 | 1400 |
| Example 4 | 60 | 1.0 | 2.0 | 100 | 6 | 1.0 | 1 | 1.89 | 2700 |
| Comparative example 1 | 60 | 1.0 | 2.0 | 100 | 1 | 1.0 | 1 | — | — |
| Comparative example 2 | 60 | 1.0 | 2.0 | 100 | 0.5 | 1.0 | 1 | — | — |
| Comparative example 3 | 60 | 1.0 | 2.0 | 80 | 3 | 1.0 | 1 | — | — |
| Comparative example 4 | 60 | 1.0 | 2.0 | 100 | 3 | 0 | 4 | 1.10 | 5200 |
| Comparative example 5 | 60 | 1.2 | 2.0 | 100 | 3 | 0 | 4 | 1.10 | 5200 |
| Comparative example 6 | 60 | 1.2 | 2.0 | 80 | 3 | 0 | 2 | — | — |
| Comparative example 7 | 100 | 1.2 | 2.0 | 100 | 12 | 0 | 4 | — | — |
| Comparative example 8 | 126 | 0.6 | 7.2 | 100 | 3 | 0 | 2 | — | — |
| Comparative example 9 | 150 | 1.2 | 2.0 | 60 | 12 | 0 | 4 | — | — |
| Comparative example 10 | 200 | 1.2 | 2.0 | 80 | 12 | 0 | 4 | — | — |
| Comparative example 11 | 250 | 1.2 | 2.0 | 80 | 12 | 0 | 6 | — | — |

Notes:
Each "—" in the columns of the flux and the separation factor shows that separation was not conducted because of inadequate formation of the film.

Table 1 shows clearly that each membrane of the examples according to the present invention having the film formed through one film-forming process exhibits high separation factor.

Although the seed crystals were employed in comparative examples 1–3, the membranes were unable to separate liquid mixtures since the synthesis time were too short (in comparative examples 1,2) or the synthesis temperature was too low (in comparative example 3).

Examples where the porous support is of mullite material

EXAMPLES 5–10

A membrane for liquid mixture separation was prepared in the same manner as in Example 1 except that the porous support of a mullite material was used and the experimental conditions shown in Table 2 were employed.

Comparative Examples 12–16

A membrane for liquid mixture separation was prepared in the same manner as in Examples 5–10, and the experimental conditions shown in Table 2 were employed.

Each of the membranes prepared in the Examples 5–10 and comparative examples 12–16 was measured for separation properties in the same manner as Example 1, the results of which are shown in Table 2.

TABLE 2

Examples where the support is of porous mullite:

| | $\dfrac{H_2O}{Na_2O}$ | $\dfrac{Na_2O}{SiO_2}$ | $\dfrac{SiO_2}{Al_2O_3}$ | Temperature (°C.) | Reaction time (h) | amount of seed crystals (mg/cm$^2$) | times of processing (times) | flux (kg/m$^2$h) | separation factor (—) |
|---|---|---|---|---|---|---|---|---|---|
| Example 5 | 60 | 1.0 | 2.0 | 100 | | 1 | 1 | 2.55 | 10000 |
| Example 6 | 60 | 1.0 | 2.0 | 100 | 3 | 0.5 | 1 | 2.31 | 5000 |
| Example 7 | 60 | 1.0 | 2.0 | 100 | 3 | 10 | 1 | 1.80 | 2800 |
| Example 8 | 60 | 1.0 | 2.0 | 100 | 3 | 30 | 1 | 1.0 | 2100 |
| Example 9 | 60 | 1.0 | 2.0 | 100 | 4 | 1.0 | 1 | 2.07 | 8100 |
| Example 10 | 60 | 1.0 | 2.0 | 100 | 2 | 1.0 | 1 | 2.49 | 1160 |
| Comparative example 12 | 60 | 1.0 | 2.0 | 100 | 1 | 1.0 | 1 | — | — |
| Comparative example 13 | 60 | 1.0 | 2.0 | 100 | 0.5 | 1.0 | 1 | — | — |
| Comparative example 14 | 60 | 1.2 | 2.0 | 100 | 3 | 0 | 1 | — | — |
| Comparative example 15 | 60 | 1.2 | 2.0 | 100 | 3 | 0 | 5 | 1.18 | 520 |
| Comparative example 16 | 100 | 1.0 | 2.0 | 100 | 4 | 0 | 4 | 1.15 | 2200 |

Notes:
Each "—" in the columns of the flux and the separation factor shows that separation was not conducted because of inadequate formation of the film.

Table 2 shows clearly that each membrane of the examples according to the present invention having the film formed through one film-forming process exhibits high separation factor.

As shown in Table 1, 2, the membranes having the mullite support are better in the separation factor than the membranes having the alumina support. Tables 1,2 show also that the seed crystals are preferable to be held on the support in an amount of 0.5–10 mg/cm$^2$.

For comparison, published data of GFT film (crosslinked polyvinyl alcohol), PAA (polyacrylic acid)/ polyion film, xanthone film, polyimide film, and polyimide asym film (PMDA-ODA polyimide) are also shown in Table 3.

It is apparent from Table 3 that the membrane for liquid mixture separation of the present invention lets water permeate more selectively than the conventional one and thus it permits efficient separation of water-ethanol mixture.

TABLE 3

| Separation film | processing temperature [°C.] | aqueous content of liquid to be separated [wt %] | Q [kg/m$^2$ · hr] | α [—] | Notes |
|---|---|---|---|---|---|
| A-type zeolite film | 75 | 10 | 2.55 | >10000 | Example 5 |
| GFT film | 80 | 5 | 0.01 | 9500 | Comparative examples |
| PAA/polyion film | 60 | 5 | 1.63 | 3500 | |
| chitosan film | 60 | 10 | 0.1 | 6000 | |
| polyimido film | 75 | 10 | 0.01 | 850 | |
| polyimido asym. film | 60 | 10 | 0.22 | 280 | |

Table 4 shows the feed solution temperature, water concentration in feed solution, total permeation flux (Q), and separation factor (α).

For comparison, the published data of Chitosan film, polyimide film (made by Ube Industries Ltd.), and cellulosic film (made by Hitachi Zosen Corporation) are also shown in Table 4.

It is apparent from Table 4 that the membrane for liquid mixture separation of the present invention lets water vapor permeate more selectively than the conventional one and thus it permits efficient separation of water-ethanol mixture.

TABLE 4

| Separation film | processing temperature [°C.] | aqueous content of liquid to be separated [wt %] | Q [kg/m² · hr] | α [—] | Notes |
|---|---|---|---|---|---|
| A-type zeolite film | 105 | 10 | 9.08 | 9305 | Example 5 |
| chitosan film | 40 | 10 | 0.019 | 124 | Comparative examples |
| polyimido film | 110 | 6 | 1.5 | 350 | |
| cellulose film | 50 | 10 | 1.0 | 750 | |

What is claimed is:

1. A membrane for liquid mixture separation comprising,
   a porous support,
   seed crystals held on a surface of said support, said seed crystals having an average particle size of 1–5 μm and being held on the surface of the support in an amount of 0.5–5.0 mg/cm², and
   an A-type zeolite film deposited on said porous support after the seed crystals are held thereon.

2. A membrane as defined in claim 1, wherein the porous support has an average pore diameter of 0.05–10 μm and a porosity of 10–60%.

3. A membrane as defined in claim 1, wherein the porous support is made one of alumina, silica, zirconia, silicon nitride, silicon carbide, aluminum, silver, stainless steel, polyethylene, polypropylene, polytetrafluoroethylene, polysulfone, and polyimide.

4. A membrane as defined in claim 1, wherein the porous support is an alumina porous support with an average pore diameter of 0.1–2 μm and a porosity of 30–50%.

5. A membrane as defined in claim 1, wherein the A-type zeolite film is deposited on the porous support as the result of hydrothermal synthesis of silica and almina source as starting materials.

6. A membrane as defined in claim 5, wherein the starting materials contain constituents in the following molar ratios $H_2O/Na_2O = 20-300$ $Na_2O/SiO_2 = 0.3-2$ $SiO_2/Al_2O_3 = 2.6$.

7. A membrane as defined in claim 1, wherein an A-type zeolite is deposited on at least one side of the porous support with the thickness of the A-type zeolite film 10–50 μm and the membrane has a total thickness of about 0.5–2 mm including the thickness of the support.

8. A membrane as defined in claim 1, which is used for separation of liquid mixtures by pervaporation method or vapor permeation method.

9. A membrane as defined in claim 8, which is used for separation of water-alcoholic hydrocarbon mixtures.

10. A membrane as defined in claim 1, wherein said seed crystals are A-type zeolite.

11. A membrane as defined in claim 10, wherein said porous support is alumina material; and when a feed liquid containing organic solution and water is permeated through the membrane to obtain a permeated liquid, total permeation flux per unit area and unit time is between 1.89 and 2.46 kg/m²·h, and a separation factor of α is between 2,700 and 10,000, said separation factor being calculated by $$\alpha = \frac{P_{ph}/P_w}{F_{ph}/F_w}$$

where $F_{ph}$ and $F_w$ respectively represent average concentrations, defined in wt %, of organic solution and water in the feed liquid, and $P_{ph}$ and $P_w$ respectively represent average concentrations, defined in wt %, of organic solution and water in the permeated liquid.

12. A membrane as defined in claim 10, wherein said porous support is mullite; and when a feed liquid containing organic solution and water is permeated through the membrane to obtain a permeated liquid, total permeation flux per unit area and unit time is between 2.07 and 2.55 kg/m²·h, and a separation factor of α is between 1,160 and 10,000, said separation factor being calculated by $$\alpha = \frac{P_{ph}/P_w}{F_{ph}/F_w}$$

where $F_{ph}$ and $F_w$ respectively represent average concentrations, defined in wt %, of organic solution and water in the feed liquid, and $P_{ph}$ and $P_w$ respectively represent average concentrations, defined in wt %, of organic solution and water in the permeated liquid.

* * * * *